United States Patent [19]

Kumagai et al.

[11] Patent Number: 5,181,982
[45] Date of Patent: Jan. 26, 1993

[54] TIRE FORMING DRUM INCLUDING STITCHING SUPPORTS

[75] Inventors: Yuzo Kumagai, Niiza; Kichinosuke Nishimoto, Tokyo, both of Japan

[73] Assignee: Bridgestone Corporation, Tokyo, Japan

[21] Appl. No.: 704,258

[22] Filed: May 22, 1991

[30] Foreign Application Priority Data

May 28, 1990 [JP] Japan .................. 2-135286

[51] Int. Cl.⁵ .............................. B29D 30/26
[52] U.S. Cl. .................. 156/415; 156/414; 156/420
[58] Field of Search ........... 156/402, 408–413, 156/414–419, 420, 421.6, 130.3, 132, 135

[56] References Cited

U.S. PATENT DOCUMENTS

| | | | |
|---|---|---|---|
| 3,560,302 | 2/1971 | Missioux | 156/415 |
| 3,767,509 | 10/1973 | Gazuit | 156/420 X |
| 3,833,445 | 9/1974 | Mallory et al. | 156/415 X |

FOREIGN PATENT DOCUMENTS

| | | |
|---|---|---|
| 1579158 | 10/1965 | Fed. Rep. of Germany . |
| 1510912 | 11/1966 | France . |
| 2033999 | 4/1970 | France . |
| 2352661 | 12/1977 | France . |
| 47-393 | 1/1972 | Japan . |
| 48-81977 | 11/1973 | Japan . |
| 49-13629 | 4/1974 | Japan . |
| 55-114554 | 9/1980 | Japan . |
| 55-132234 | 10/1980 | Japan . |
| 62-109629 | 5/1987 | Japan . |
| 64-16630 | 1/1989 | Japan . |
| 64-30738 | 2/1989 | Japan . |

*Primary Examiner*—Geoffrey L. Knable
*Attorney, Agent, or Firm*—Sughrue, Mion, Zinn, Macpeak & Seas

[57] ABSTRACT

A tire forming drum includes a pair of bead lock devices, a shaping device, ply turning-up devices for turning up a ply, and a plurality of stitching supports circumferentially arranged between the pair of bead lock devices. Each of the stitching supports is composed of a rigid lever having one end pivotally connected to a housing of one of the bead lock device and the other end provided with a close contact portion to be brought into close contact with an inner circumferential surface of one bead portion of a tire being formed. An actuating device for each of the stitching supports is composed of a rigid link having one end pivotally connected to a mid portion of the stitching support and the other end pivotally connected to one of sleeves movable in axial directions of the forming drum. The stitching supports are able to expand by movements of the sleeves and the bead lock devices arranged on both sides toward each other.

4 Claims, 5 Drawing Sheets

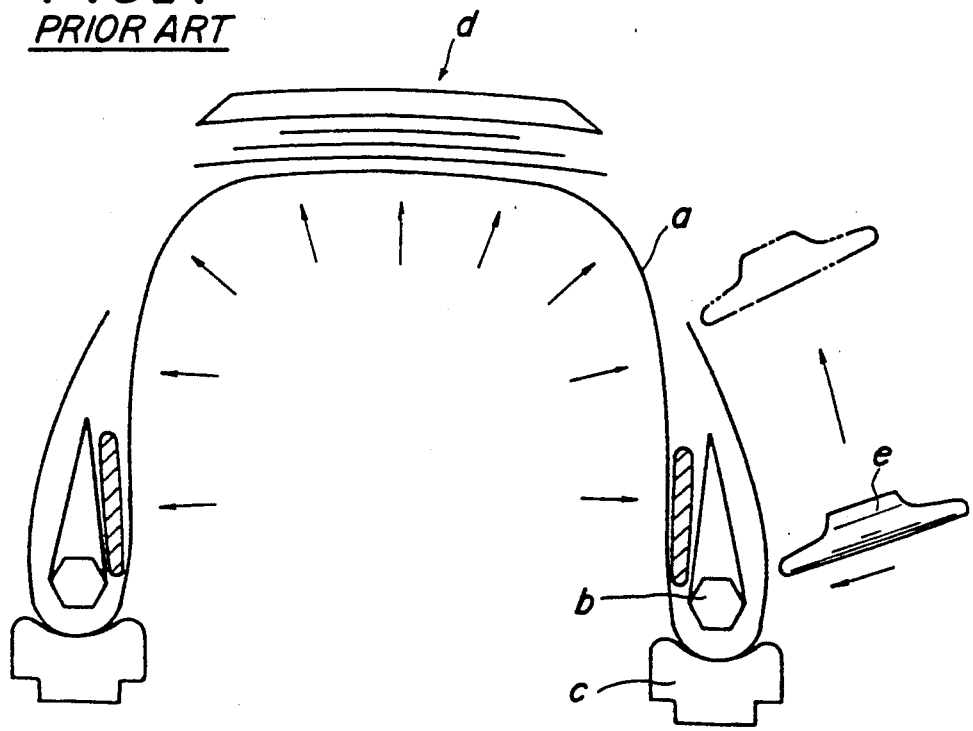
FIG_1
PRIOR ART
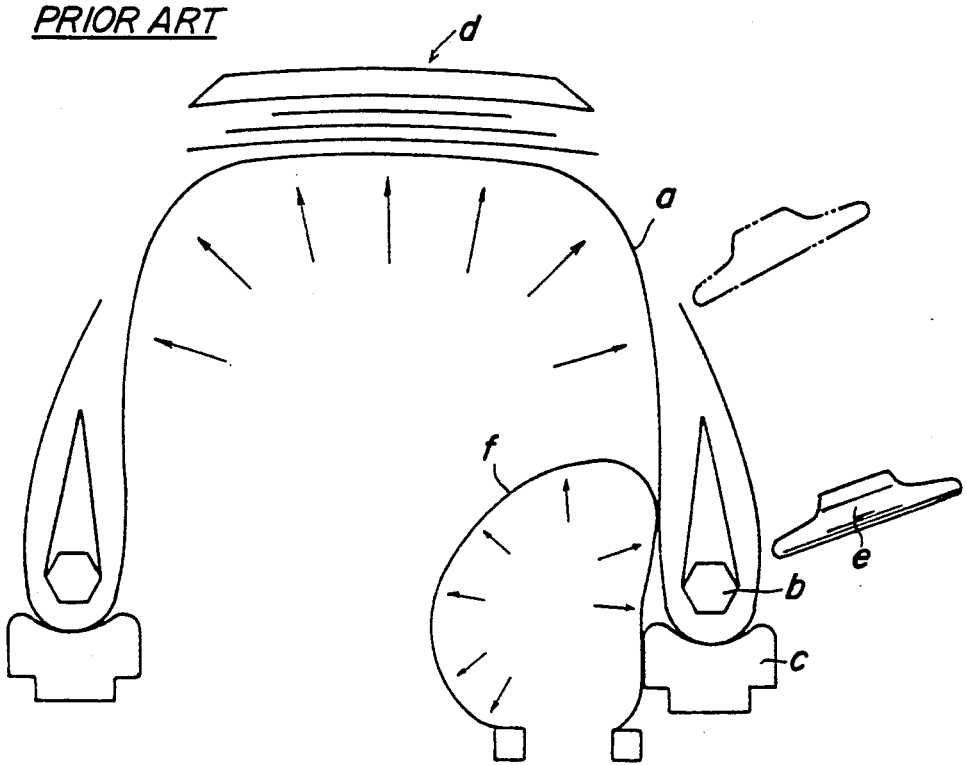
FIG_2
PRIOR ART

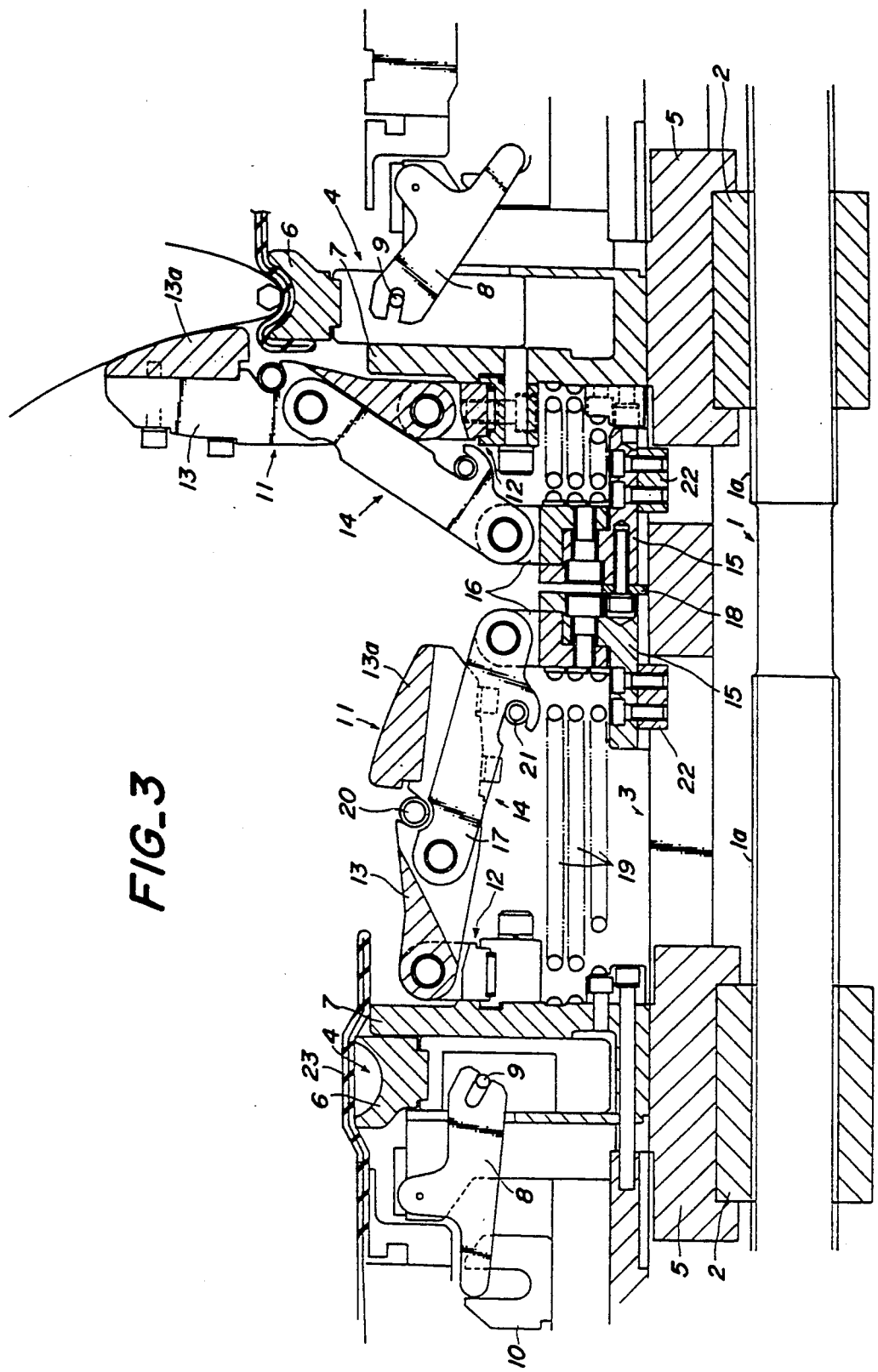
FIG._3

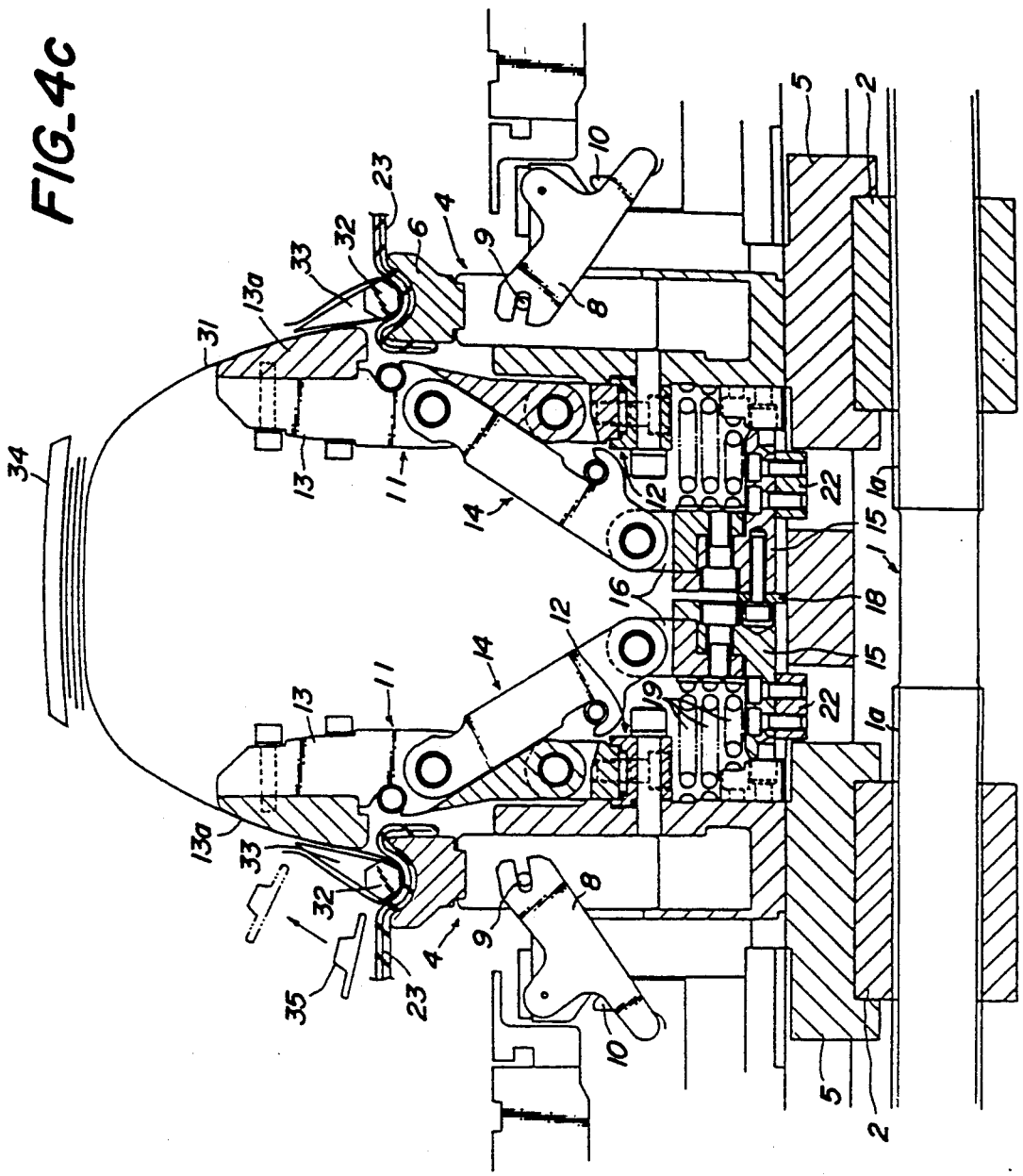

TIRE FORMING DRUM INCLUDING STITCHING SUPPORTS

BACKGROUND OF THE INVENTION

This invention relates to a tire forming drum suitable for use in so-called single stage forming wherein a green tire is completely produced on one forming drum. More particularly it relates to a tire forming drum capable of sufficiently preventing residual air in tire bead portions.

A conventional tire forming drum of this kind generally includes a pair of bead lock means, shaping means and ply turning-up means for turning up a ply of a tire. In forming a tire with this forming drum, as shown in FIG. 1 bead cores b are arranged on the outer side of an inner lining (a) such as an inner liner or a carcass ply. With the bead cores b supported together with the inner lining (a) by increasing diameters of bead lock means c, pressurized air is injected into inside of the inner lining (a) by means of the shaping means (not shown). At the same time, a crown portion of the inner lining (a) is joined with the inner circumferential surface of a belt-tread band d by movement of the pair of bead lock means toward each other, while the configuration of the tire is conditioned. Thereafter, both side edges of the inner lining (a) are folded thereupon or turned up as shown in FIG. 1 by means of ply turning-up means (not shown). Moreover, stitcher rolls e are urged against the tire so that the air existing between the laminated layers of the tire is expelled therefrom and the layers are sufficiently joined with each other.

With such a forming drum of the prior art, however, the urging force of the stitcher rolls e applied to the tire is supported only by the shaping inner pressure jetted into the inner lining (a). Therefore, bead portions of the tire are likely to be deformed due to insufficient support of the urging force of the stitcher rolls e. Consequently, it is impossible to pressurize the inside of the bead portions to a required pressure of this. As a result of this, the air is permitted to remain between the bead portions and the carcass ply as shown by hatched portions in FIG. 1.

In order to solve this problem, it has been proposed that shoulder bladders f are used to urge inner circumferential surfaces of bead portions toward stitcher rolls as shown in FIG. 2. However, the shoulder bladders f could not still sufficiently support the urging force of the stitcher rolls e. Moreover, owing to the existence of the bead lock means c the shoulder bladders f could not be brought into sufficiently close contact with the bead portions, particularly, the radially inner ends thereof. Accordingly, a high stitching effect could not be substantially accomplished in this prior proposal.

SUMMARY OF THE INVENTION

It is an object of the invention to provide a tire forming drum which eliminates all the disadvantages of the prior art and elevates stitch surface pressure acting upon tire bead portions and hence enhances the stitch effect sufficiently so that the air is effectively prevented from remaining in the tire bead portions.

In order to accomplish this object, in a tire forming drum including a pair of bead lock means, shaping means, ply turning-up means for turning up a ply, and a plurality of stitching supports circumferentially arranged between the pair of bead lock means, according to the invention each of said stitching supports is composed of a rigid lever having one end pivotally connected to a housing of one of the bead lock means and the other end provided with a close contact portion to be brought into close contact with an inner circumferential surface of one bead portion of a tire being formed, and actuating means for each of the stitching supports is composed of a rigid link having one end pivotally connected to a mid portion of the stitching support and the other end pivotally connected to one of sleeves movable in axial directions of the forming drum, thereby enabling the stitching supports to expand by movements of the sleeves and the bead lock means arranged on both sides toward each other.

With this tire forming drum according to the invention, after holding bead cores by the bead lock means, the pair of bead lock means are moved toward each other. The stitching supports are arranged associated with the respective bead lock means and spaced from each other in axial directions of the drum, while actuating means for the respective stitching supports are pivotally connected to sleeves movable in the axial directions of the drum. As a result of the movement of the pair of the bead lock means toward each other, the sleeves abut against each other directly o indirectly through a spacer. Owing to the abutment of the sleeves the actuating means are rotated radially outwardly of the drum so that the stitching supports are progressively moved into their expanded positions. When both the bead lock means have arrived at the approached limit positions, the stitching supports are completely in close contact with inner circumferential surfaces of the bead portions of a tire being formed with close contact portions provided on the stitching supports. Therefore, the bead portions are prevented from deforming inwardly in tire width directions in a reliable manner with the aid of the rigidity of the stitching supports themselves.

In applying stitcher rolls to the bead portions after turning up ends of a ply, therefore, the urging force of the stitcher rolls are completely supported by the stitching supports. Consequently, the stitch surface pressure can be sufficiently raised. As a result, residual air between the bead portions and the carcass ply can be substantially completely prevented.

The invention will be more fully understood by referring to the following detailed specification and claims taken in connection with the appended drawings.

BRIEF DESCRIPTION OF THE DRAWINGS

FIG. 1 is a schematic sectional view illustrating the prior art;

FIG. 2 is a schematic sectional view illustrating the prior art proposed for eliminating the disadvantage of the prior art shown in FIG. 1;

FIG. 3 is a partial sectional view of one embodiment of the tire forming drum according to the invention; and FIGS. 4a, 4b and 4c are views illustrating operation steps of the tire forming drum shown in FIG. 3.

DESCRIPTION OF THE PREFERRED EMBODIMENTS

Figure 4B:
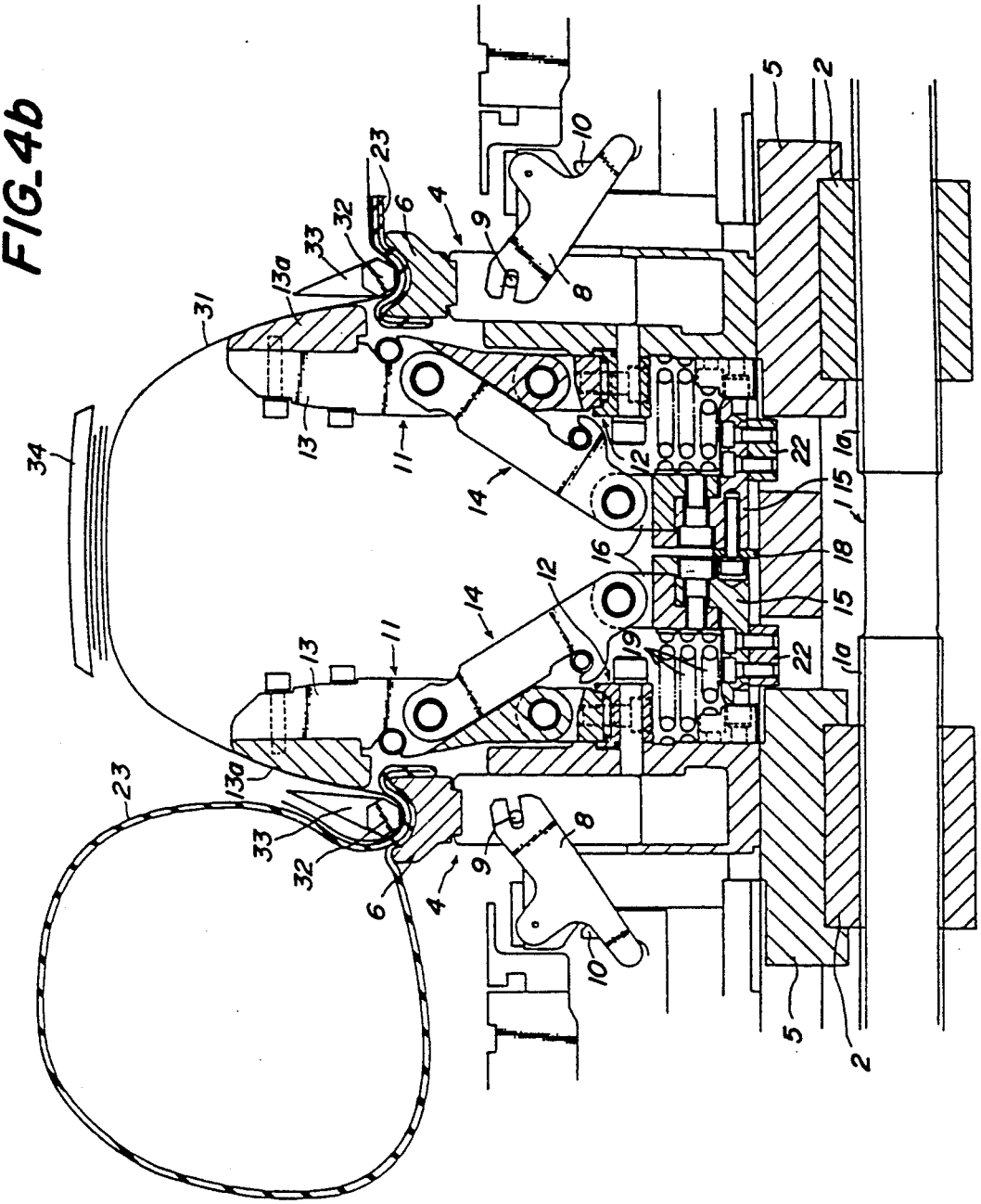

FIG. 3 is a partial longitudinal sectional view illustrating one embodiment of the tire forming drum according to the present invention, wherein the lower half of the forming drum is not shown because it is the same as the upper half of the forming drum. In this drawing, moreover, the right half illustrates one stitching support in an expanded state, while the left half illustrates its collapsed state.

Reference numeral 1 denotes a screw shaft having, on both sides of its center, male screw portions 1a whose turns are in reverse directions. Female screw members 2 are threadedly engaged on the male screw portions 1a, respectively. To the female screw members 2 are fixed shifters 5, respectively, extending through a hollow cylinder member 3 arranged around the screw shaft 1 and causing bead lock means 4 and other means (not shown) to be displaced.

With this arrangement, when the screw shaft 1 is rotated, both the female screw members 2 are moved toward and away from each other, and therefore the shifters 5 can move in slots formed in the hollow cylinder member 3 together with the bead lock means and other means in response to the movements of the female screw members 2.

The pair of bead lock means 4 are movable toward and away from each other by means of the shifters in this manner. Each of the bead lock means 4 is composed of a plurality of bead lock sliders 6 circumferentially arranged and radially movable to expand and contract diameters of an imaginary circle formed by themselves. A housing 7 permits the bead lock sliders 6 to move radially inwardly and outwardly.

Such radial movements of each of the bead lock sliders 6 of the bead lock means 4 can be accomplished in the following manner. A rocking member 8 is provided whose intermediate portion is pivotally supported on a part integral with the housing 7 and whose one end passes through the housing and is engaged with a pin 9 provided on the bead lock slider 6 and the other end is engaged with a piston 10 slidably movable in axial directions of the hollow cylinder member 3. The pistons 10 are slidably moved between the retracted state as shown in the left half of the drawing, FIG. 3 and the advanced state as shown in the right half in the drawing. In this case, the rocking members 8 operate as bell cranks to convert the axial displacements of the pistons 10 to radial displacements of the bead lock sliders 6.

Moreover, reference numeral 11 illustrates a plurality of stitching supports circumferentially arranged between the pair of bead lock means. In this embodiment, each of the stitching supports 11 comprises a rigid lever 13 having one end pivotally connected to the housing 7 through a bracket 12 and the other end provided with a stitching plate or close contact portion 13a. The stitching plate 13a has a contour commensurate with an inner shape of a tire to be formed and adapted to be brought into close contact with an inner circumferential surface of a bead portion of the tire. With this arrangement, it is ensured that the stitching supports 11 are able to expand and collapse in radial planes and the free ends of the stitching supports 11 are brought into complete contact with inner circumferential surfaces of bead portions of the tire to be formed.

In this case, the stitch plate or close contact portion 13a at the free end of the rigid lever 13 can of course be appropriately modified in accordance with sizes and shapes of tires to be formed.

Each of actuating means 14 for moving the stitching supports 11 is composed of rigid links 17 and causes the stitching supports 11 to expand and collapse. Each of the rigid links 17 has one end pivotally connected to the mid portion of the stitching support 11 and the other end pivotally connected through a bracket 16 to a sleeve 15 movable in axial directions of the hollow cylinder member 3. The rigid links 17 are pivotally rotatable in radial planes about the pivoted points to the sleeve 15.

In the collapsed state as shown in the left half of FIG. 3, the positional relation between the stitching support 11 and the actuating means 14 is selected so that the pivoted point between the support 11 and the means 14 is located radially outwardly of a straight line segment connecting the pivoted point of the stitching support 11 to the housing 7 and the pivoted point of the rigid link 17 of the actuating means 14 to the sleeve 15. This positional relation between the stitching support 11 and the actuating means 14 ensures that when the housing 7 is moved toward the sleeve 15, the actuating means 14 and hence the stitching supports 11 are rotated to their expanded positions.

In this embodiment, the expanding rotation of the actuating means or the movement of the housings 7 toward the sleeves 15 is accomplished by an abutment of the sleeves 15 provided associated with the respective bead lock means 4. The abutment of the sleeves 15 is caused by the movement of the bead lock mean 4 toward each other, while the optimum timing of the abutment depends upon sizes of tires to be formed. In this embodiment, therefore, a spacer 18 having a required thickness is attached to one of the sleeves 15 and both of the sleeves 15 are caused to abut against each other through the spacer 18 therebetween, thereby adjusting the timing of the actuating means for expanding the stitching support. Consequently, if a size of a tire does not require the spacer, the forming of a tire can be carried out without providing it.

The spacer 18 may be attached to the center of the hollow cylinder member 3 instead of fixing it to any one of the sleeve 15.

In the preferred embodiment, moreover, the following measures may be employed in order to smoothly perform the expanding rotation and collapsing movement of the stitching supports 11 and the actuating means 14. Springs 19 are interposed between the housings 7 and the sleeves 15 so that the housing 7 and the sleeves 15 are forced away from each other. Springs 20 and 21 are provided on the stitching supports 11 and the actuating means 14 to force them into their collapsing directions, respectively. Moreover, each of the sleeves 15 is provided in the inner circumferential surface with at least one slider 22 which is adapted to be fitted in a guide groove (the slot for permitting of the shifter moving in this embodiment) formed in and extending in the axial direction of the hollow cylinder member 3, thereby permitting the axial movement of the sleeve 15 but restraining any rotational movement of the sleeve 15 about its axis.

In FIG. 3, reference numeral 23 illustrates a bladder as a means for turning up plies. This bladder 23 is folded upon itself on the inner side of the bead portion supporting surfaces of the bead lock sliders 6 into the form of an annular bag as a whole. This tire forming drum further includes a plurality of pressurized air injection openings (not shown) formed in the hollow cylinder member 3 between both the bead lock means and serving as shaping means.

The operation of the tire forming drum constructed as above described will be explained hereinafter referring to FIGS. 4a, 4b and 4c.

Figure 4A:
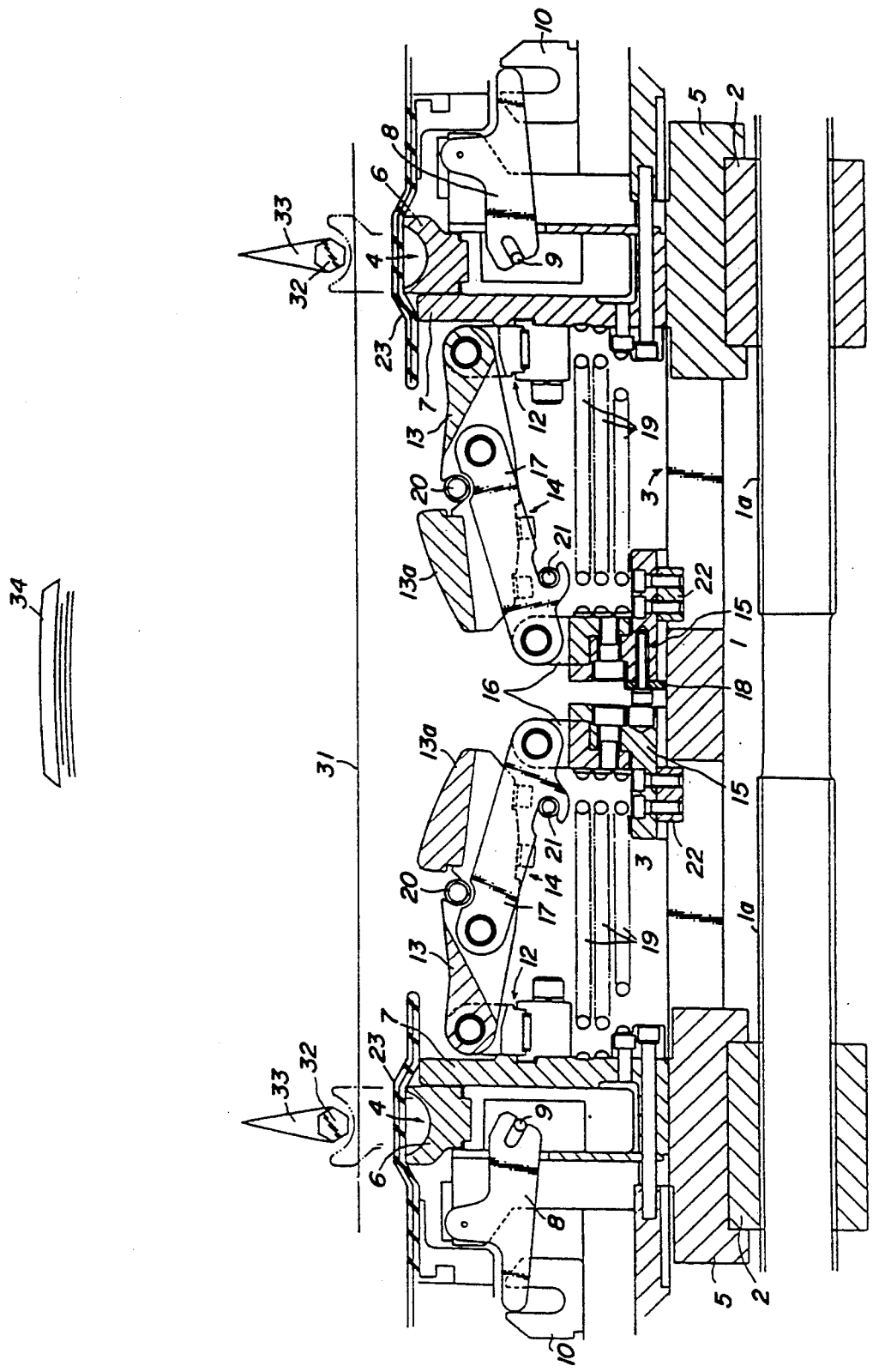

As first shown in FIG. 4a, a pair of bead cores 32 and a pair of bead fillers 33 spaced predetermined distances on the right and left sides are set mainly on the outer side of a carcass 31 wound around the forming drum. The rocking members 8 are then actuated to move the bead lock sliders 6 radially outwardly to increase diameters of their imaginary circles. As a result, the bead cores 32 together with the carcass 31 are held by the bead lock sliders 6 as shown in phantom lines in FIG. 4a.

Thereafter, shaping air is injected from the pressurized air openings onto the inner circumference of the carcass 31, while the screw shaft 1 is rotated, for example, in the normal direction to move both the female screw members 2 and hence both the bead lock means 4 toward each other. When both the bead lock means 4 approach to predetermined positions, the pair of sleeves 15 forced away from each other by means of the springs 19 are caused to abut against each other directly or indirectly through the spacer 18. Even after such an abutment of the sleeves 15, the injection of the shaping air and the movement of the bead lock means 4 toward each other are continued so that distances between the sleeves 15 and the housings 7 are progressively narrowed, with the result that the actuating means 14 and the stitching supports 11 are brought into their expanded positions.

The movements of the actuating means 14 and the stitching supports 11 into the expanded positions are stopped when both the bead lock means 4 have approached predetermined positions or approached limit positions corresponding to a size of a tire to be formed. At this moment, the stitching supports 11 have been in close contact with inner circumferential surfaces of bead portions of the tire without any clearances as shown in FIG. 4b.

On the other hand, as a result of the arrival of the bead lock means 4 at the approached limit positions, the carcass 31 is caused to expand radially outwardly and a crown portion of the carcass 31 is joined with the inner circumferential surface of a belt-tread band 34 previously set at a predetermined position on the outer side of the carcass.

Thereafter, the bladders 23 as ply turning up means are expanded by means of pressurized air at a predetermined pressure to fold or turn up the side edges of the ply 31 to predetermined positions over whole the circumference of the tire as shown in the left half of FIG. 4b. After the completion of the turn-up of the ply, the pressurized air in the bladders 23 is exhausted so that they are flattened as shown in the right side of FIG. 4b.

As shown in FIG. 4c, furthermore, stitcher rolls 35 are urged with predetermined forces mainly against outer surfaces of the bead portions and the belt-tread band 34. As a result, the stitcher rolls 35 are rotated by frictional forces between the rolls 35 and the tire and moved along the outer surfaces of the bead portions and the band 34. Consequently, the laminated layers are joined with each other and the air interposed between the respective layers is exhausted therefrom.

In the embodiment shown in the drawings, when the stitcher rolls 35 are applied to the outer surfaces of the tire, the urging forces of the stitcher rolls 35 are securely supported particularly at the bead portions of the tire by the stitching supports 11 in close contact with the inner circumferential surfaces of the bead portions. Therefore, inward deformations of the tire in its width directions are substantially completely prevented at any positions. As a result, stitching effect is greatly improved so that adhesive forces between the respective layers of the tire can be sufficiently enhanced, while the residual air between the respective layers of the tire can be very effectively prevented.

Thereafter, the shaping air is exhausted and both the bead lock means 4 are moved away from each other so that the actuating means 14 and the stitching supports 11 are brought into the collapsed positions as shown in the left half of FIG. 3. The formed tire or a green tire is then removed from the forming drum.

In this embodiment, by virtue of the stitching supports 11 composed of the rigid members and adapted to be in close contact with the inner circumferential surfaces of bead portions of a tire, the urging forces of the stitcher rolls 35 are sufficiently supported by the stitching supports 11, while the air between the layers of the tire is substantially completely removed, which would otherwise be likely to remain between them.

As can be seen from the above explanation, according to this invention any residual air in bead portions can be removed and adhesive force between tire members can be enhanced. Consequently, quality of tires to be produced can be more improved, and stability in quality of tires can be realized according to the invention.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A tire forming drum including a pair of bead lock means, shaping means for forming a carcass play into a toroidal shape, ply turning-up means for turning up the ply, the two sets of a plurality of stitching supports circumferentially arranged between the pair of bead lock means, each of said stitching supports in each of the two sets comprising a rigid lever having one end pivotally connected to a housing of the bead lock means and the other end provided with a close contact portion to be brought into close contact with an inner circumferential surface of one bead portion of a tire being formed, and actuating means for each of the stitching supports comprising a rigid link having one end pivotally connected to a mid portion of the stitching support and the other end pivotally connected to one of a pair of sleeves movable in axial directions of the forming drum, the pivot point between each of the stitching supports and the rigid link associated therewith being located radially outwardly of a straight line segment connecting the pivoted point of the stitching support to the housing and the pivoted point of the rigid link to the sleeve in the collapsed state, thereby enabling the stitching supports to expand by movements of the sleeves and the bead lock means arranged on both sides towards each other.

2. The tire forming drum as set forth in claim 1, wherein the movements of the sleeves and the bead lock means toward each other are accomplished by abutment of the sleeves and a spacer is interposed between the sleeves to adjust timing of the stitching supports for actuation into their expanded positions.

3. The tire forming drum as set forth in claim 1, wherein in each of two sets of combinations of the housing and the sleeve, a spring is interposed between the housing and the sleeve and having opposite ends engaged with the stitching support and the actuating means, respectively, to force them into their collapsing directions so that they are forced away from each other, thereby smoothly performing the expanding rotation and collapsing movement of the stitching supports and the actuating means.

4. The tire forming drum as set forth in claim 1, wherein each of the sleeves is provided in an inner circumferential surface with at least one slider which is guided in the axial directions of the forming drum.

* * * * *